United States Patent
Palin et al.

(10) Patent No.: US 9,781,756 B2
(45) Date of Patent: Oct. 3, 2017

(54) DEVICE PAIRING

(71) Applicant: Nokia Technologies Oy, Espoo (FI)

(72) Inventors: Arto Palin, Viiala (FI); Jukka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/731,507

(22) Filed: Jun. 5, 2015

(65) Prior Publication Data

US 2015/0373760 A1 Dec. 24, 2015

(30) Foreign Application Priority Data

Jun. 19, 2014 (EP) .................................... 14173104

(51) Int. Cl.
*H04W 12/06* (2009.01)
*H04W 76/02* (2009.01)
*H04W 4/00* (2009.01)
*H04W 24/00* (2009.01)

(52) U.S. Cl.
CPC ......... *H04W 76/023* (2013.01); *H04W 4/008* (2013.01); *H04W 12/06* (2013.01); *H04W 24/00* (2013.01); *H04W 76/02* (2013.01)

(58) Field of Classification Search
CPC ...... H04W 12/06; H04W 4/008; H04W 76/02
See application file for complete search history.

(56) References Cited

U.S. PATENT DOCUMENTS

| | | | |
|---|---|---|---|
| 7,953,400 B2* | 5/2011 | Lee | H04L 63/0492 370/328 |
| 2006/0116107 A1* | 6/2006 | Hulvey | H04M 1/6066 455/411 |
| 2013/0288604 A1* | 10/2013 | Chang | H04W 84/18 455/41.2 |
| 2014/0287687 A1* | 9/2014 | Bakin | H04W 4/005 455/41.2 |
| 2015/0050886 A1* | 2/2015 | Donaldson | H04W 4/00 455/41.2 |
| 2015/0147970 A1* | 5/2015 | Tan | H04W 12/08 455/41.2 |

* cited by examiner

*Primary Examiner* — David Bilodeau
(74) *Attorney, Agent, or Firm* — Locke Lord LLP (57) ABSTRACT

A technique for facilitating connection establishment between wireless devices is provided. According to an example embodiment, the technique comprises storing, at an apparatus for wireless communication, one or more default authentication keys for authenticating a wireless device that is not paired with the apparatus; selectively operating the apparatus in one of predefined states, said states comprising at least a first state where the apparatus is connectable but not discoverable by other wireless devices; verifying, in response to having received, when the apparatus is operated in said first state, a connection request from a first wireless device that is not paired with the apparatus, whether at least one of said authentication keys is a valid authentication key for said first wireless device, and establishing, in response to having found at least one of said authentication keys to be a valid authentication key for said first wireless device, an authenticated connection with said first wireless device.

19 Claims, 4 Drawing Sheets

DEVICE PAIRING

This application claims priority to European patent application number 14173104.2, filed Jun. 19, 2014, the entire contents of which are incorporated herein by reference.

TECHNICAL FIELD

The example and non-limiting embodiments of the present invention relate to device discovery, selection and pairing in context of wireless communication.

BACKGROUND

Establishing a wireless connection between two devices, including e.g. steps of device discovery, device selection and connection setup is in many occasions a complicated operation. Multitude of different communication techniques, communication protocols and user-interface components for controlling use of these techniques/protocols may make it uncomfortable or even difficult for a user of a device to successfully perform the steps required for establishing a connection.

Device pairing is a technique that has been developed to facilitate connection establishment between wireless devices in a secure manner when using a short-range wireless communication technique such as Bluetooth (BT) or Wireless Local Area Network (WLAN) according to an IEEE 802.11 standard. In device pairing two devices, e.g. a user device and an access point or a user device and an accessory device, in the course of a device selection procedure and a connection establishment procedure between the devices create a shared secret key, which may also be referred to as an authentication key or as a link key.

The pairing process may be followed by a bonding process, which involves storing the link key in the two devices to be used for authentication in subsequent connection establishment procedures between the same two devices. Upon a subsequent connection request from a paired-and-bonded device the link key may be applied to authenticate the other device and hence the connection may be established in a secure manner without need for user action. Consequently, the process of pairing and bonding contributes towards a user-friendly connection establishment between devices, especially between frequently used device pairs.

However, while the pairing and bonding provides user-friendly approach e.g. for wirelessly connecting a user device to access points and accessory devices that are regularly used, the pairing and bonding process that is based on the link key may not be a convenient solution for all usage scenarios. As an example in this regard, when a user has a first user device paired with one or more other devices (e.g. access point(s) and/or accessory device(s)) and he/she wishes to establish the same pairings also for a second user device, the link key based pairing and bonding process needs to be carried out separately with the second user device and each of the other devices to create respective link keys. Especially with a high number of other devices and/or in case the other devices require taking specific user actions to initiate the pairing this may be a tedious and time-consuming process.

As another example, if a first user device is shared by a number of users but the pairing with certain other devices needs to be limited to one or more selected users of the first user device, the link key based approach may not be able to provide the desired limitation without an additional user authentication mechanism. Such mechanisms, however, a likely to complicate the design, implementation and use of the first user device and/or the use of certain other devices—which may be inconvenient or even infeasible especially in case of simple devices with limited (user-interface) capabilities.

SUMMARY

According to an example embodiment, an apparatus for wireless communication is provided, the apparatus comprising means for storing one or more default authentication keys for authenticating a wireless device that is not paired with the apparatus, means for selectively operating the apparatus in one of predefined states, said states comprising at least a first state where the apparatus is connectable but not discoverable by other wireless devices, means for receiving connection requests from other wireless devices, means, responsive to receiving, when the apparatus is operated in said first state, a connection request from a first wireless device that is not paired with the apparatus, for verifying whether at least one of said default authentication keys is a valid authentication key for said first wireless device, and means, responsive to having found at least one of said authentication keys to be a valid authentication key for said first wireless device, for establishing an authenticated connection with said first wireless device.

According to another example embodiment, a method is provided, the method comprising storing, at an apparatus for wireless communication, one or more default authentication keys for authenticating a wireless device that is not paired with the apparatus; selectively operating the apparatus in one of predefined states, said states comprising at least a first state where the apparatus is connectable but not discoverable by other wireless devices; verifying, in response to having received, when the apparatus is operated in said first state, a connection request from a first wireless device that is not paired with the apparatus, whether at least one of said authentication keys is a valid authentication key for said first wireless device, and establishing, in response to having found at least one of said authentication keys to be a valid authentication key for said first wireless device, an authenticated connection with said first wireless device.

According to another example embodiment, a computer program comprising computer readable program code configured to cause performing at least the following when said program code is executed on a computing apparatus: storing, at the apparatus, one or more default authentication keys for authenticating a wireless device that is not paired with the apparatus; selectively operating the apparatus in one of predefined states, said states comprising at least a first state where the apparatus is connectable but not discoverable by other wireless devices; verifying, in response to having received, when the apparatus is operated in said first state, a connection request from a first wireless device that is not paired with the apparatus, whether at least one of said authentication keys is a valid authentication key for said first wireless device, and establishing, in response to having found at least one of said authentication keys to be a valid authentication key for said first wireless device, an authenticated connection with said first wireless device.

The computer program referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

As described in the background section, the term pairing is applied herein to refer to two peer devices creating or obtaining a shared secret upon connection establishment, whereas the term bonding is applied herein to refer to the paired peer devices storing the created/obtained shared secret for authentication purposes upon subsequent connection attempts by the other paired and bonded peer device. In the following, such a shared secret created/obtained by the two peer devices is referred to as an authentication key or as a link key.

Consequently, in a subsequent connection attempt by the bonded device the other device is already pre-authenticated and hence there is no need to carry out the pairing procedure again to authenticate the other device, the bonding thereby facilitating fast and secure connection establishment in an automated or semi-automated manner. On the other hand, if the bonding has not been carried out, a pairing procedure may be carried out each time a connection is established between the devices. However, also the pairing procedure may be carried out in an automated or semi-automated manner.

In addition to storing the link key, the bonding process may further comprise storing other information about the bonded device, e.g. an identification of the other device (e.g. a MAC address of the device or other suitable address or identifier), an identification of a user associated with the other device (e.g. a username, an email address or other suitable identifier)

Figure 1:
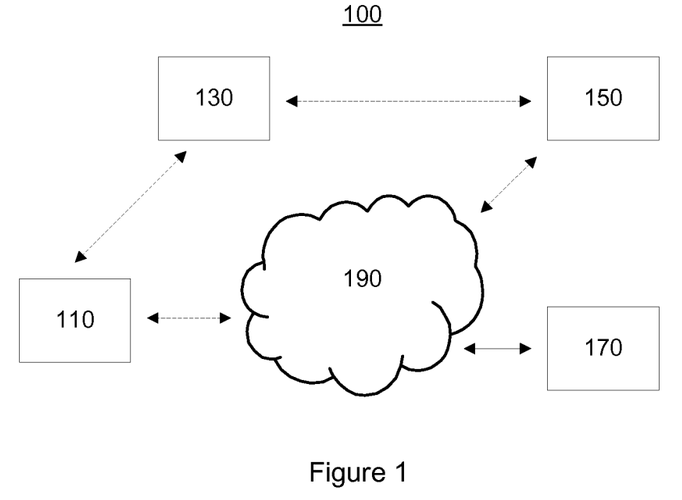
FIG. 1 schematically illustrates some components of an example wireless communication arrangement.

FIG. 1 schematically illustrates some components or entities of a wireless communication arrangement 100 to depict an exemplifying framework for one or more embodiments of the present invention. The communication arrangement 100 may be considered to represent a use case where a first device 110 and a second device 130 establish or have established a pairing—and possibly bonding—with each other and hence create or have created a link key, carry out a procedure to define default pairing information that may be applied to facilitate subsequent connection establishment to the second device 130 by the first device 110 and/or other device(s), and provide the default pairing information to a server device 170 via a network 190. The pairing information may comprise e.g. a default link key created in the procedure between the devices 110 and 130 and/or information that identifies the first device 110 and/or a user thereof. Subsequently, a third device 150 may obtain the default pairing information from the server device 170 and use the default pairing information to establish a connection with the second device 130 and to authenticate itself without a need to carry out the pairing process. In other words, in this exemplifying framework the third device 150 is enabled to re-use the default pairing information created in the procedure between the first device 110 and the second device 130.

In the communication arrangement 100 the connection between the first device 110 and the second device 130 and the connection between the third device 150 and the second device 130 is assumed to be a wireless one. The connection between the first device 110 and the network 190 and the connection between the third device 150 and the network 190 may be a wired or wireless one. The connection between the server device 170 and the network 190 is typically, but not necessarily, a wired one. The network 190 may comprise, for example, a personal area network (PAN), a local area network (LAN) and/or a wide area network (WAN) such as the Internet.

The components of the communication arrangement 100 provide a non-limiting example that depicts a single second device 130 and a single third device 150 for clarity of illustration. However, there may be one or more second devices 130 and one or more third devices 150. In the following, the term second device 130, when used in the singular form, is applied to jointly refer to any of the one or more second devices 130 unless explicitly stated otherwise. Similarly, the term third device 150, when used in the singular form, is applied to jointly refer to any of the one or more third devices 150 unless explicitly stated otherwise.

As an example scenario within the framework of the communication arrangement 100, a certain user may use the first device 110 to establish pairing with the second device 130 and may wish to create and share the associated default pairing information to be re-used by one or more third devices 150 used by the certain user, thereby avoiding the need to separately carry out the pairing procedure between each of the third devices 150 used by the certain user and the second device 130. Such a scenario may be encountered, for example, when each of the first and third devices 110, 150 is a user device (e.g. a mobile phone, a tablet computer, a laptop computer, etc.) and used by a certain user and the second device 130 is an accessory device (e.g. a printer, a display, an audio input/output device, a sensor device, etc.) he/she wishes to pair with each of his/her user devices.

As another example scenario, a user may establish pairing between the first device 110 and a high number of second devices 130 and may wish to create and share the associated default pairing information with one or more third devices 150. Such a scenario may be encountered, for example, when the first device 110 is a user device used by a certain user as his/her primary device paired with a number of accessory devices, and this certain user is adopting the third device 150 as his/her new primary user device and/or when the certain user is introducing the third device 150 as a further user device for use in parallel with the first device 110.

Figure 2A:
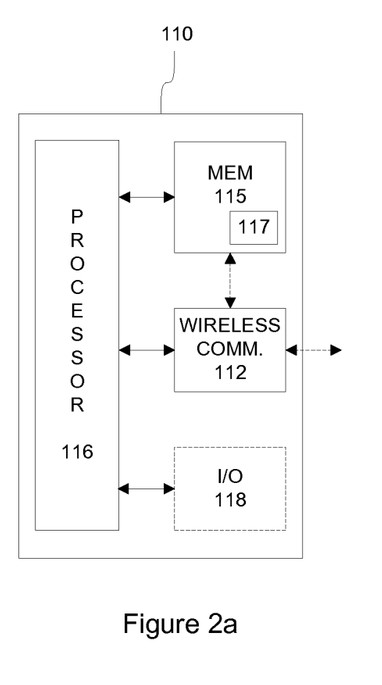
FIG. 2a schematically illustrates some components of a device according to an example embodiment.

The first device 110 is typically, but not necessarily, a mobile user device. FIG. 2a schematically illustrates some components of an exemplifying first device 110. The first device 110 comprises a wireless communication portion 112 for wireless communication with other devices. The wireless communication portion 112 may enable, for example, communication with other devices using a short-range wireless communication technique or protocol that enables a point-to-point wireless connection with another device. The first device 110 is hence capable of communicating with other devices that are equipped with communication means using the same technique/protocol. The wireless communication portion 112 may be considered to include one or more wireless communication apparatuses included in (or hosted by) the first device 110 (or the first apparatus 110). The wireless communication portion 112 may be also considered as wireless communication means 112.

The first device 110 further comprises a processor 116 and a memory 115 for storing data and computer program 117. The first device 110 may further comprise user I/O (input/output) components 118 that may be arranged, possibly together with the processor 116 and a portion of the computer program 117, to provide a user interface for receiving input from a user of the first device 110 and/or providing output to the user of the first device 110. The processor 116 may be arranged to control operation of the first device 110 e.g. in accordance with the computer program 117 stored in the memory 115, in accordance with the user input received via the user I/O components 118 and/or in accordance with information received via the wireless communication portion 112. The memory 115 and the computer program 117 stored therein may be further arranged to, with the processor 116, to provide a control function for controlling operation of the wireless communication portion 112, possibly together with a control portion or a control function that may be provided within the wireless communication portion 112 (which will be described later in this text). The first device 110 may comprise further components or portions in addition to those depicted in FIG. 2a.

Figure 2B:
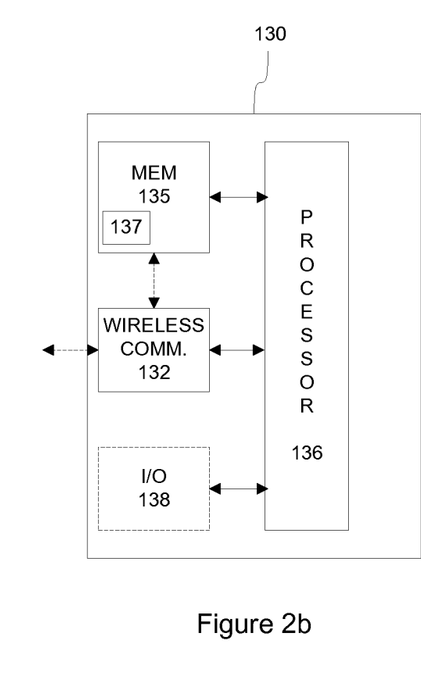
FIG. 2b schematically illustrates some components of a device according to an example embodiment.

The second device 130 may be a mobile device or a fixed device. FIG. 2b schematically illustrates some components of an exemplifying second device 130. The second device 130 comprises a wireless communication portion 132 similar to the wireless communication portion 112, which may, for example, enable the short-range wireless communication with the first device 110 and/or with other devices equipped with communication means using the same technique/protocol. Along the lines described for the wireless communication portion 112, the wireless communication portion 132 may be considered to include one or more wireless communication apparatuses, and the wireless communication portion 132 may be also considered as a wireless communication means 132 included in (or hosted by) the second device 130.

The second device 130 further comprises a processor 136 and a memory 135 for storing data and computer program 137. The second device 130 may further comprise user I/O (input/output) components 138 that may be arranged, together with the processor 136 and a portion of the computer program 137, to provide a user interface for receiving input from a user of the second device 130 and/or providing output to the user of the second device 130. The processor 136 may be arranged to control operation of the second device 130 in accordance with the computer program 137 stored in the memory 135 and possibly further in accordance with the user input received via the user I/O components and/or in accordance with information received via the wireless communication portion 132. The memory 135 and the computer program 137 stored therein may be further arranged to, with the processor 136, to control operation of the wireless communication portion 132, possibly together with a control portion of a control function that may be provided within the respective communication portion 132 (which will be described later in this text). The second device 130 may comprise further components or portions in addition to those depicted in FIG. 2b.

The third device 150 may be considered as a device having a structure similar to the first device 110 depicted in FIG. 2a. To facilitate subsequent description of exemplifying operation of the third device 150 with specific references to some of its components, a component of the third device 150 corresponding to a component 11x of the first device 110 may be referred to as the components 15x.

Each of the wireless communication portions 112, 132, 152 may comprise one or more respective communication apparatuses. A communication apparatus may be provided e.g. as a respective chipset and/or as a respective communication module. For clarity and brevity of description, each communication apparatus comprised in the wireless communication portion 112, 132, 152 may be considered as a single logical portion that may also be capable of processing at least some of the information received via the wireless connection and/or at least some of the information that is to be transmitted via the wireless connection without external control from other components of the respective device 110, 130, 150 (e.g. from the processor 116, 136, 156). In an embodiment, each of the communication apparatuses in the wireless communication portion 112, 132, 152 may comprise e.g. a wireless transceiver portion for wireless communication and a control portion (or a control function) for controlling operation of the respective wireless transceiver portion and for processing information received/transmitted via the respective wireless transceiver portion. Such a control function may be provided by hardware means, by software means or by a combination of hardware means and software means. As an example in this regard, the wireless communication apparatus may comprise a memory and a processor, and a computer program code stored in the memory may be arranged to, with the processor, provide the control function for controlling operation of the respective wireless communication apparatus either independently or jointly with the control function provided by the memory 115, 135, 155, the computer program 117, 137, 157 and the processor 116, 136, 157 of the respective device 110, 130, 150.

The wireless connection between the wireless communication portions 112 and 132 and/or between the wireless communication portions 152 and 132 may be provided by employing a suitable short-range wireless communication technique or protocol. The term short-range wireless communication as used herein refers to a wireless communication technique or protocol that enables typical operational range in the scale of tens of meters, e.g. up to 100 meters. However, especially in an indoor environment, the operational range of such short-range wireless communication technique/protocol may be significantly shorter e.g. due to walls and other fixed structures as well as furniture etc. that are likely to partially block or interfere with the radio communication between the wireless communication portions 112 and 132. On the other hand, in favorable conditions in outdoor use the operational range may extend to several hundreds of meters. Examples of such wireless techniques/ protocols include the Bluetooth (BT) Basic Rate/Enhanced Data Rate (BR/EDR) and the Bluetooth Low Energy (BLE) protocols specified e.g. in the Bluetooth Specification Version 4.1, Covered Core Package version 4.1 (publication date 3 Dec. 2013), incorporated herein by reference in its entirety. In the following, this document is referred to as a Bluetooth Specification. Further examples of applicable short-range wireless techniques/protocols include e.g. Zig-Bee (IEEE 802.15.4) and Z-Wave protocols.

While a number of short-range wireless communication techniques/protocols known in the art are applicable in the framework of the communication arrangement 100, in the following some aspects of various embodiments of the present invention are described with references to the BT BR/EDR protocol. However, the BT BR/EDR serves as an illustrative and non-limiting example in this regard, and the description generalizes into any wireless communication protocol where the first device 110 and the second device 130 are capable of establishing a pairing with each other in the meaning described in the foregoing.

Figure 3:
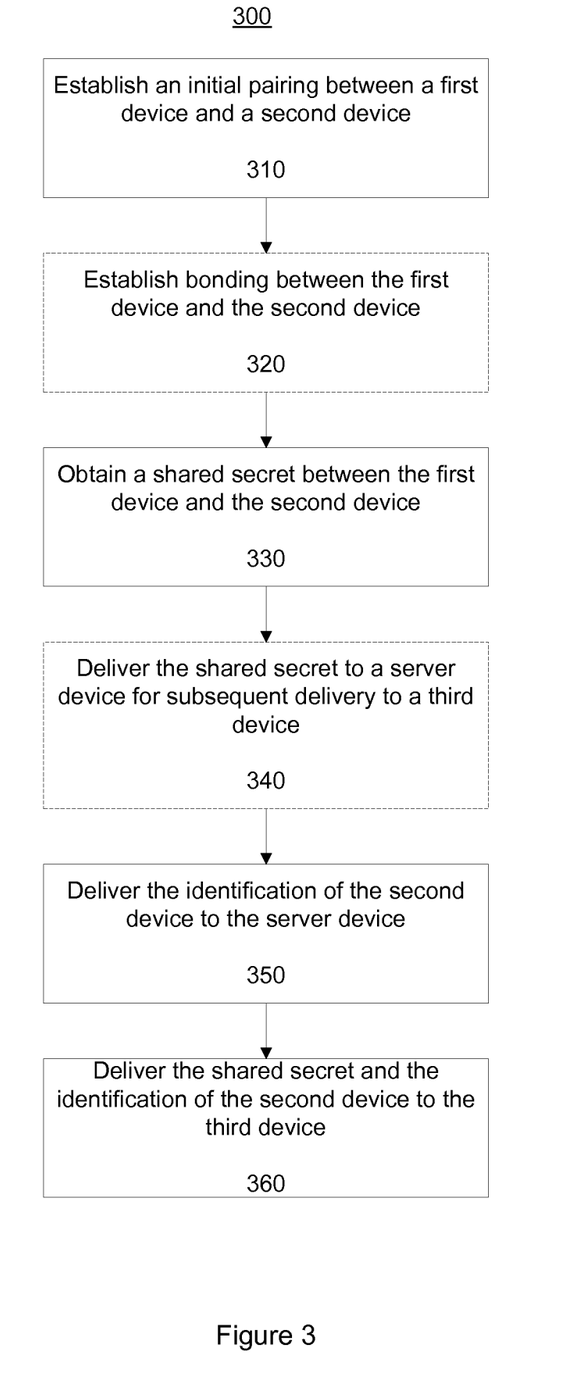
FIG. 3 illustrates a method according to an example embodiment.

FIG. 3 illustrates an exemplifying method 300 for creating and sharing pairing information obtained in a pairing procedure between the first device 110 and the second device 130 to enable the third device 150 subsequently to discover the second device 130 and to authenticate itself with the second device 130 in an automated manner without a need for user involvement.

The operation of the method 300 may be preceded by an initial device discovery and device selection, whereas the method 300 may be carried out during and/or after a connection establishment between the first device 110 and the second device 130.

In this regard, to provide the initial device discovery, the second device 130 may be arranged to operate in a mode or state where it is discoverable by other devices (e.g. the inquiry scan operation of the BT BR/EDR protocol), and the first device 110 may be arranged to transmit one or more messages, referred to as inquiry messages, to discover other devices of desired type and/or desired characteristics and to scan for response message(s) sent from one or more other devices in response to the inquiry messages (e.g. the inquiry operation of the BT BR/EDR protocol). The second device 130 may be arranged to transmit, in response to receiving one or more inquiry messages from the first device 110, an inquiry response (e.g. frequency hop synchronization (FHS) packet possibly followed by an extended inquiry response (EIR) packet in the BT BR/EDR protocol) that carries information required for connection establishment with the second device 130.

The initial device selection and connection establishment with a non-bonded device may involve user of the first device 110 making, via the user interface, a selection whether to establish a connection to a device, e.g. the second device 130, encountered in the initial device discovery phase. In this regard, the first device 110 may be configured to display, via the user interface, at least some of the information received in the inquiry response originating from the second device 130 to enable selection of the encountered device, e.g. the second device 130. Moreover, the first device 110 may be arranged to receive, via the user interface, a user selection to establish a connection with the second device 130 and, consequently, to establish the connection with the second device 130 in response to the user selection. The connection establishment may involve a procedure (e.g. a paging procedure) for exchanging (further) information required for the connection establishment between the first device 110 and the second device 130.

The method 300 proceeds from the connection establishment phase between the first device 110 and the second device 130. The method 300 commences with initial pairing between the first device 110 and the second device 130, as indicated in block 310. The pairing process to establish the initial pairing may be carried out as part of the connection establishment procedure or it may follow the connection establishment procedure.

In the course of the initial pairing process, the first device 110 and the second device 130 are arranged to create a shared secret, i.e. an authentication key, referred to herein as a link key $K_1$ that may be used to enable subsequent authentication between the devices 110, 130 (e.g. the link key in the BT BR/EDR protocol, as described in section 4.2 of the Bluetooth Specification). The initial pairing may be carried out using a technique known in the art, and the initial pairing may be carried out using in-band means or out-of-band means. The pairing may be, optionally, followed by bonding, as indicated in block 320. The bonding process may involve the first device 110 and the second device 130 storing the link key $K_1$ for authentication of the other device in subsequent connection attempts by the other device.

The method 300 continues with obtaining a second shared secret, i.e. an authentication key, between the first device 110 and the second device 130, as indicated in block 330. The second shared secret is referred to herein as a default link key $K_d$. The obtained default link key $K_d$ is stored in the second device 130 and possibly in the first device 110 for subsequent authentication purposes. The role of the default link key $K_d$ is different from that of the link key $K_1$ in that the default link key $K_d$ may be subsequently delivered for further devices and may be re-used (for authentication) by the further devices, whereas the link key $K_1$ is specific to the pair of the first device 110 and the second device 130. Therefore, the link key $K_1$ (and any link key specific to a certain pair of devices) is referred to herein as a dedicated link key, whereas the default link key $K_d$ (and any other default link keys) may also be referred to as a shared link key.

The default link key $K_d$ may be further communicated to further devices to facilitate automated authentication in subsequent connection establishment with the second device 130 via re-use of the default link key $K_d$, as will be described later in this text in more detail. In order to ensure that the pairing and possible bonding between the first device 110 and the second device 130 is not compromised due to any of the further device making use of the shared default link key $K_d$ in subsequent connection establishment and authentication with the second device 130, the default link key $K_d$ is, preferably, different from the link key $K_1$.

The first device 110 and/or the second device 130 may be arranged to obtain the default link key in one of a plurality of ways. As a few examples,

- the default link key $K_d$ may be pre-stored in one of the first device 110 and the second device 130 and delivered to the other device 110, 130;
- the default link key $K_d$ may be created in one of the first device 110 and the second device 130 (e.g. on basis of an indicator associated with the other device 110, 130) and delivered to the other device 110, 130;
- the default link key $K_d$ may be pre-stored or created in the server device 170 one of the first device 110 and the second device 130 (e.g. on basis of an indicator associated with one or more of the first device 110 and the second device 130) and delivered to the first device 110 and/or to the second device 130 (and possibly further to the other device 110, 130).

Obtaining the default link key $K_d$ and delivering the default link key $K_d$ from the server device 170 to the first device 110 or to the second device 130 and from one of the first device 110 and the second device 130 to the other device 110, 130 may involve using a predefined default key management protocol designed for this purpose. Such a default key management protocol may, additionally, enable exchange of information between the involved devices in order to transmit and/or receive information associated with any of the involved devices 110, 130, 170 and/or a user thereof, e.g. to enable creation of the default link key $K_d$ and/or other default pairing information. The default key management protocol may further enable a negotiation process regarding the origin and delivery of the default link key $K_d$.

The second device 130 may be arranged to decline from obtaining a new default link key $K_d$ in case it already has obtained a default link key and the second device 130 does not support multiple default link keys. In general, the second device 130 may be arranged to decline from obtaining a further default link key $K_d$ in response to having already obtained a predefined maximum number of default link keys, whereas the second device 130 may be arranged to proceed with obtaining a further default link key $K_d$ in response to having obtained less than the predefined maximum number of default link keys.

In case the default link key $K_d$ does not originate from the server device 170, the method 300 may continue with delivering the default link key $K_d$ to the server device 170 for subsequent delivery to one or more third devices 150, as indicated in block 340. The delivery may involve the either the first device 110 or the second device 130 configured to deliver the obtained default link key $K_d$ to the server device 170. The delivery may employ the above-mentioned default key management protocol.

The method 300 continues with delivering the identification of the second device 130 to the server device 170 for subsequent delivery to one or more third devices 150, as indicated in block 350. The delivery may involve either the first device 110 or the second device 130 configured to deliver an identification of the second device 130 to the server device 170. The identification of the second device 130 may comprise e.g. a MAC address of the wireless communication portion 132 or other suitable address or identifier associated with the second device 130. In addition to this identification, also e.g. an identification of a user of the first device 110 (e.g. an email address, a telephone number, a user account, etc.) may be delivered to the server device 170 and/or to the second device 130. If the identification of the user of the first device 110 is provided, the identified user can be said to be associated with the respective default link key $K_d$ (and vice versa). The default link key $K_d$, the identification of the second device 130, possibly together with the identification of the user of the first device 110 may be referred to as default pairing information.

The method 300 continues with delivering the default pairing information to the third device 150. This involves delivering at least the default link key $K_d$ and the identification of the second device 130 to the third device 150, as indicated in block 360. The provided information enables the third device 150 subsequently to discover the second device 130 and to authenticate itself during a connection establishment procedure with the second device 130 (as will be described in more detail later in this text).

Once having at least the default link key $K_d$, and the identification of the second device 130 included in the default pairing information in its disposal, the third device 150 may apply this information to discover the second device 130 and to authenticate itself in connection establishment with the second device 130. In parallel, the second device 130 is enabled to make use of the default link key $K_d$ stored therein in order to authenticate the third device 150 in an automated manner, i.e. without a need for user actions. In this regard, the second device 130 may be enabled to selectively operate the wireless communication portion 132 in one of a plurality of predefined states. As an example, these operational states may comprise one or more of the following, possibly together with additional operational states: a state where the wireless communication portion 132 is connectable but not discoverable by other wireless devices, a state where the wireless communication portion 132 is discoverable by other wireless devices and a state where the wireless communication portion 132 is connected with another wireless device.

Figure 4:
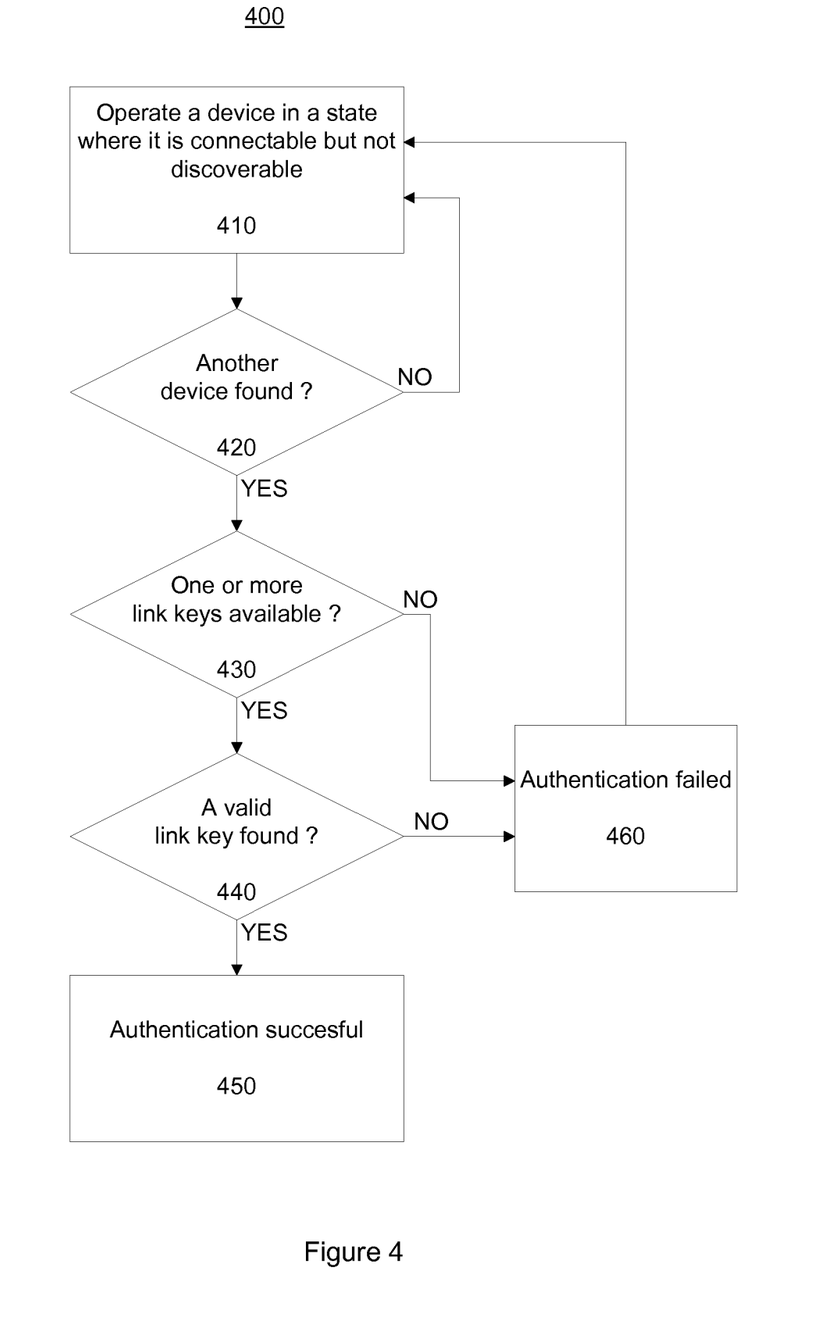
FIG. 4 illustrates a method according to an example embodiment.

FIG. 4 illustrates an exemplifying method 400 for facilitating connection establishment between the second device 130 and the third device 150 by making use of the default link key $K_d$ for authenticating the third device 150. In particular, the default link key $K_d$ is useable for automated authentication of the third device 150 that is previously unknown by the second device 130, e.g. not bonded with the second device 130. The automated authentication carried out in the course of the method 400 requires the second device 130 to have the knowledge of at least one default link key, e.g. the default link key $K_d$. In this regard, at least one default link key may be pre-stored in the memory 135 and hence available for authentication purposes in context of pairing and/or connection establishment with one or more third devices 150. The pre-stored default link key may be obtained, for example, in accordance with a procedure outlined in the foregoing in context of the method 300.

The method 400 commences from the second device 130 operating the wireless communication portion 132 in a state where it is connectable but not discoverable by other devices, as indicated in block 410. In this regard, to enable being connectable by the devices that already have knowledge of its identity, the second device 130 may be configured to operate the wireless communication portion 132 in a state where it is connectable by other devices but not discoverable by other devices. As an example, in the framework of the BT BR/EDR protocol this corresponds to page scan operation, wherein the wireless communication portion 132 is configured to scan for paging messages transmitted by other devices.

In parallel, the third device 150 may be configured to cause the wireless communication portion 152 to request connection with the second device. The connection request may involve transmitting one or more messages addressed to the wireless communication portion 132. These messages may comprise an explicit connection request and/or one or more messages that serve as request(s) for information that enables the third device 150 to establish connection with the second device 130. In this regard, the third device 150 may be arranged to make use of the identification of the second device 130 obtained from the server device 170 as part of the default pairing information to enable addressing the connection request to the second device 130. As an example, in the framework of the BT BR/EDR protocol this corresponds to paging operation, wherein the wireless communication portion 152 is arranged to transmit one or more paging messages addressed to the second device 130 (by transmitting ID packets that consist of or include a device access code (DAC) of the wireless communication portion 132, which DAC may be derived from the MAC address of the wireless communication portion 132).

While the wireless communication portion 132 of the second device 130 is naturally enabled to receive connection requests (e.g. paging messages) from any device employing the supported communication protocol, for clarity and brevity of description, in the following the operation in this regard is described with the assumption that the source of the connection request is the third device 150.

The second device 130 may be configured to proceed with the pairing and authentication procedure in response to having received the connection request from the third device 150, as indicated in block 420. The second device 130 may be further configured to cause, in response to having received the connection request from the third device 150, the wireless communication portion 132 to respond to the connection request by transmitting one or more response messages addressing the third device 150. This exchange of messages may be carried out, for example, in order to exchange synchronization information and/or other information required for connection set-up between the devices 130 and 150. As an example, in the framework of the BT BR/EDR protocol this exchange of messages corresponds to page response operation, where the second device 130 responds to paging message(s) by transmitting one or more ID packets and the third device 150 further responds by transmitting one or more frequency hop synchronization (FHS) packets to provide connection set-up information.

When the second device 130 has received and possibly responded to the connection request received from the third device 150 and other possibly required signaling exchange has been carried out, the method 400 continues with verification whether the second device 130 has one or more pre-stored link keys available therein, as indicated in block 430. The link keys available in the second device 130 may include one or more dedicated link keys and/or one or more default link keys. The dedicated link keys may comprise, for example, the dedicated link key $K_1$ described in the foregoing and/or a dedicated link key $K_3$ obtained or created in an earlier pairing (and bonding) procedure carried out between the second device 130 and the third device 150. As a further example, the link keys stored in the second device 130 may comprise the default link key $K_d$, which, as described above, may be a link key that is shared with a number of devices. In this regard, the second device 130 may be configured to verify, in response to having received the paging message(s) from another device, whether the second device 130 has one or more link keys stored therein and hence available for automated connection establishment and authentication of the other device.

In response to a failure to find any pre-stored link keys being available in the second device 130, the connection attempt with the third device 150 is failed (block 460) and the method 400 returns to operating the wireless communication portion 132 in the state where it is connectable but not discoverable by other devices (block 410). In contrast, in response to finding at least one pre-stored link key to be available in the second device 130, the method 400 proceeds to verification whether any of the pre-stored link keys is a valid link key for the source of the paging message(s), as indicated in block 440. In this regard, the second device 130 may be configured to verify, in response to having found at least one pre-stored link key to be available, whether any of the available pre-stored link keys is a valid link key for the source of the paging message(s). Suitable verification procedures are known in the art.

As an illustrative example of the verification procedure for verification of the validity of a single pre-stored link key, the second device 130 may send a message including a challenge (e.g. a random number) to the source of the paging message(s) and the source device may compute a response using a predefined function that is a function of at least the challenge and the link key associated with the second device 130 in the source device. The source may send a message that includes the response back to the second device 130, and the second device 130 computes a local reference response applying the predefined function for the challenge and the link key under verification. The verification of the link key under verification is successful in case the reference response is equal to the response received from the source (implying that that the second device 130 and the source have applied identical link keys), whereas the verification is unsuccessful in case the response received from the source is different from the reference response. As an example, assuming that the source device is the third device 150, the verification is successful e.g. in case both the second device 130 and the third device 150 apply the dedicated link key $K_3$ obtained or created in an earlier pairing (and bonding) procedure carried out between these devices and in case both the second device 130 and the third device 150 apply the dedicated link key $K_3$.

In the above example, the second device 130 acts as a verifier while the source (e.g. the third device 150) acts as a claimant. As another example, the verification procedure may be carried with the reversed roles, i.e. such that the source acts as the verifier (and hence sends the challenge and verifies the received response) while the second device 130 acts as the claimant (and hence computes the response on basis of the received challenge).

In case there are multiple pre-stored link keys available in the second device 130, the above-described exemplifying procedure between the verifier and the claimant may be carried until a valid link key has been encountered among the link keys pre-stored in the second device 130 or until all available pre-stored link keys have been considered without finding a valid one.

As an example, in the framework of the BT BD/EDR protocol a verification procedure following that specified in the Bluetooth Specification, vol. 2, Part C, Section 4.2 may be employed.

The second device 130 may be arranged to apply a verification procedure in order to verify whether any of the pre-stored link keys is a valid link key for the source of the connection request, i.e. for the third device 150 (and/or the wireless communication portion 152 thereof). The verification procedure may consider all pre-stored link keys or a limited subset of the pre-stored link keys in a predefined order of preference, such that the verification is successfully completed—and hence the third device 150 is successfully authenticated—in response to finding the first pre-stored valid link key, while the verification is terminated—and hence the authentication fails—in response to a failure to find any of the considered pre-stored link keys to be valid. The preference order may define that any dedicated link keys under consideration are verified first, followed by verification of any default link keys under consideration. Such an order of preference results in making use of the possible direct pairing and bonding carried out earlier with the third device 150 if the corresponding dedicated link key ($K_3$) is available and resorting to a pairing that relies on the (shared) default link key $K_d$ in case no dedicated link key ($K_3$) indicating pairing and bonding directly with the third device 150 is available.

The verification procedure may further consider additional information received from the third device 150 in selection of the pre-stored link key(s) to be considered in the verification procedure. As an example, the second device 130 may receive the identification of the source device in the course of the signaling exchange carried out as part of the connection establishment (e.g. in a FHS packet in case the BT BR/EDR protocol is being applied). In such a scenario the second device 130 may first consider in the verification procedure any pre-stored dedicated link keys associated with the identified source device, followed by consideration of any pre-stored default link keys if needed. If no pre-stored dedicated link keys associated with the source device are available in the second device 130, the verification procedure may proceed directly to consideration of any available pre-stored default link keys.

The verification procedure may further consider additional information associated with the default link key $K_d$, for example the identification of the user of the first device 110. As an example in this regard, the second device 130 may receive an identification of the user from the third device 150 (e.g. in the connection request or other messages originating from the third device 150) and consider in the verification procedure only the pre-stored default link key(s) and/or the pre-stored dedicated link key(s) that are associated with this identified user.

Consequently, pairing between the second device 130 and the third device 150 is successful in case the third device 150 is successfully authenticated as the outcome of the verification procedure, as indicated in block 450, and the method 400 may proceed to operate the wireless communication portion 132 in a connected state. In contrast, the pairing between the second device 130 and the third device 150 fails and the pairing attempt is rejected in case the outcome of the verification procedure indicates a failure to authenticate the third device 150, as indicated in block 460, and the method 400 may return to operate the wireless communication portion 132 in the state where it is connectable but not discoverable by other devices (block 410). In this regard, the second device 130 may be configured to operate the wireless communication portion 132 in accordance with the outcome of the verification procedure, e.g. to cause the wireless communication portion 132 to establish the connection with the third device 150 or to reject the pairing attempt and return to operate the wireless communication portion 132 in the state where it is connectable but not discoverable by other devices in accordance with the outcome.

A failed pairing attempt from the third device 150 due to failed authentication may further result the second device 130 prohibiting a predefined number of subsequent pairing attempts (e.g. one) or any subsequent pairing attempts by the third device 150 in general. As another example, a failed pairing attempt may result in the second device 130 prohibiting a predefined number of subsequent pairing attempts (e.g. one) or any subsequent pairing attempts s by the third device 150 that rely on the default link key $K_d$.

Figure 5:
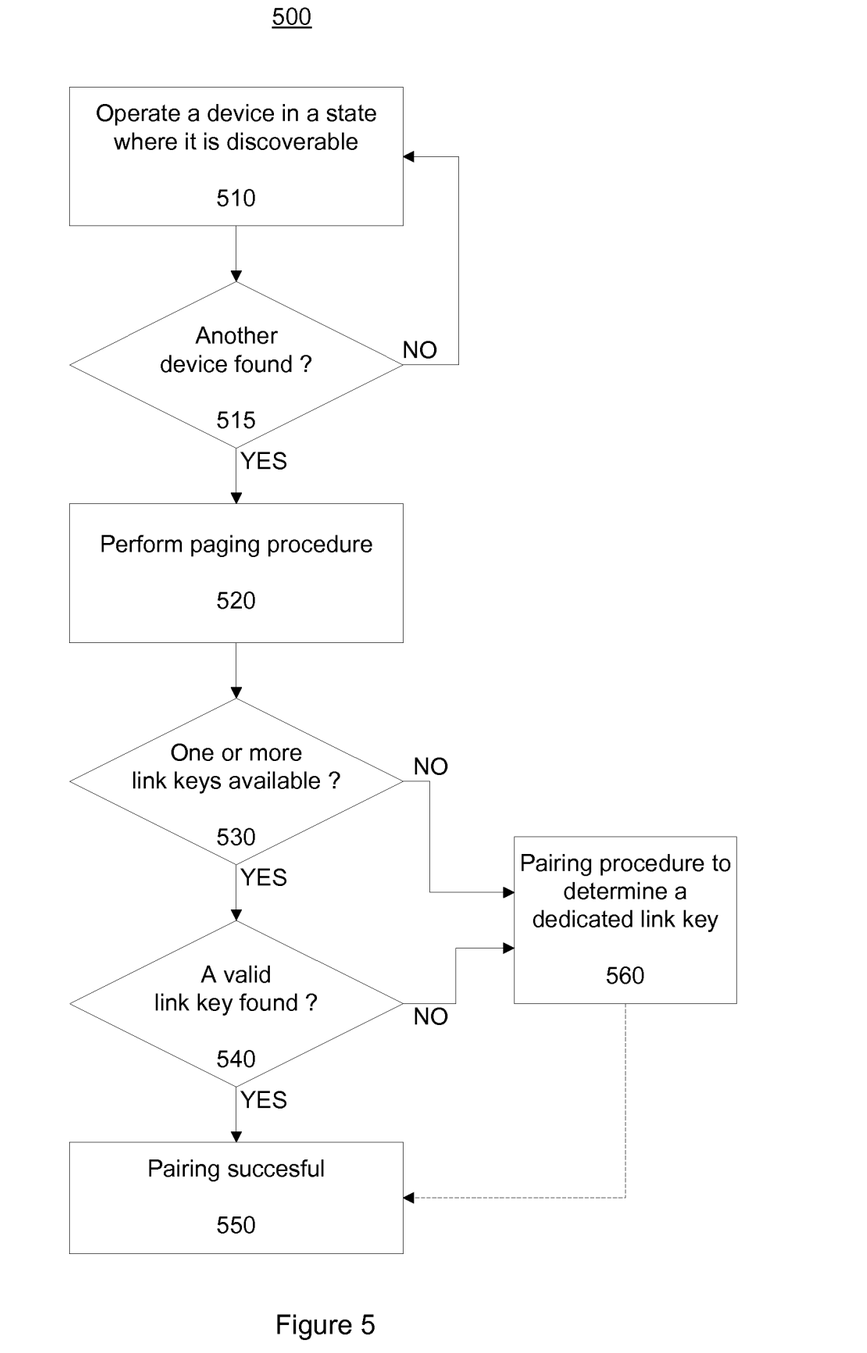
FIG. 5 illustrates a method according to an example embodiment.

As an alternative to authentication described with references to method 400, a 'standard' pairing procedure that proceeds from device discovery by the third device 130 may be applied. FIG. 5 illustrates an outline of an exemplifying method 500 in this regard. As described in the foregoing, the second device 130 may be enabled to selectively operate the wireless communication portion 132 in one of a plurality of predefined states, e.g. in one of the following: a state where the wireless communication portion 132 is connectable but not discoverable by other wireless devices, a state where the wireless communication portion 132 is discoverable by other wireless devices and a state where the wireless communication portion 132 is connected with another wireless device. Consequently, the second device 130 may be arranged to enable selectively operating the wireless communication portion 132 such that the connection establishment may be carried out in accordance with the method 400 or in accordance with the method 500, in dependence of the operational state.

The method 500 commences from the second device 130 operating the wireless communication portion 132 in a state where it is discoverable by other devices, as indicated in block 510. As an example, in the framework of the BT BR/EDR protocol this corresponds to inquiry scan operation, wherein the wireless communication portion 132 is configured to scan for inquiry messages transmitted by other devices.

In parallel, the third device 150 may be operated in a device discovery state in order to find other devices. In this regard, the third device 150 may be arranged to cause the wireless communication portion 152 to transmit one or more inquiry messages. The second device 130 may be configured to proceed with the device discovery procedure in response to having detected the presence of the third device 150 (block 515), e.g. in response to detecting the inquiry message(s) transmitted from the third device 150. The second device 130 may be further configured to cause, in response to having detected inquiry message(s), the wireless communication portion 132 to respond to the inquiry message(s) by transmitting one or more inquiry response messages. Subsequently, each of the second device 130 and the third device 150 may transmit and/or receive one or more messages in order to exchange synchronization information and/or other information required for connection set-up. As an example, in the framework of the BT BR/EDR protocol the operation corresponding to block 515 may correspond to inquiry response operation, where the second device 130 responds to ID packet(s) transmitted as paging message(s) from the third device 150 by transmitting one or more FHS packets to provide connection set-up information.

After the inquiry process, the method 500 proceeds to carrying out a paging procedure to facilitate connection set-up and establishment between the second device 130 and the third device 150, as indicated in block 520. In order to enable the connection establishment, the second device 130 may be arranged to cause the wireless communication portion to operate in the state where it is connectable but not discoverable by other devices (e.g. the page scan operation of the BT BR/EDR protocol) after the inquiry process has been finalized. The operation of the block 520 corresponds to the operation described in context of blocks 410 and 420 of the method 400 with the exception that here the identity of the second device 130 is obtained via the inquiry procedure (blocks 510 and 515) instead of making use of the default pairing information obtained from the server device 170.

After the paging procedure the method 500 proceeds to verification whether the second device 130 has one or more pre-stored link keys available therein, as indicated in block 530. The operation of the block 530 corresponds to that of the block 430 of the method 400 with the exception that herein only the dedicated link keys (e.g. $K_1$ and $K_3$) are considered while the default link key $K_d$ and/or any possible further default link keys are excluded from consideration.

In response to a failure to find any pre-stored (dedicated) link keys being available in the second device 130, the second device 130 proceeds to carrying out a 'standard' pairing procedure in order to create/obtain a (dedicated) link key for the pair of the second device 130 and the third device 150, as indicated in block 560. In contrast, contrast, in response to finding at least one pre-stored (dedicated) link key to be available in the second device 130, the method 500 proceeds to verification whether any of the pre-stored link keys is a valid link key for the source of the paging message(s), as indicated in block 540. In general, the operation of the block 540 corresponds to that of the block 440 of the method 400 with the exception that only the dedicated link keys are considered in the verification procedure.

Consequently, the pairing between the second device 130 and the third device 150 is successful in case the third device 150 is successfully authenticated as the outcome of the verification procedure (of block 540), as indicated in block 550, and the method 500 may proceed to operate the wireless communication portion 132 in a connected state. In contrast, in response to a failure to authenticate the third device 150 using any of the pre-stored (dedicated) link keys available in the second device 130 the second device 130 proceeds to carrying out the 'standard' pairing procedure in order to create/obtain a (dedicated) link key for the pair of the second device 130 and the third device 150 (block 560).

After having carried out an initial pairing and possible bonding with the first device 110, as an example, the second device 130 may be arranged to exclusively make use of the default link key $K_d$ for further connection attempts by any third device 150 (e.g. in accordance with the method 400). Such an approach serves to facilitate the second device 130 automatically pairing and authenticating only such devices that have obtained the default link key from the server device 170—typically with devices of a single user who wishes to make use of the second device 130 (also) with one or more third devices 150.

As another example, the second device 130 may be arranged to selectively make use of the default link key $K_d$ (e.g. in accordance with the method 400) or a 'standard' pairing and authentication procedure (e.g. in accordance with the method 500). The selection can be made, for example, via the user interface of second device 130. In this regard, a selection that causes the second device 130 to operate the wireless communication portion 132 in the state where it is connectable but not discoverable by other devices may result in automated pairing and authentication on basis of the default link key $K_d$, whereas a selection that causes the second device 130 to operate the wireless communication portion 132 in the state where it is discoverable by other devices results in using the 'standard' pairing and authentication procedure.

Referring back to components of the first device 110, the second device 130 and the third device 150 described in the foregoing, the processor 116 is configured to read from and write to the memory 115, the processor 136 is configured to read from and write to the memory 135 and the processor 156 is configured to read from and write to the memory 155. Although the processor 116, 136, 156 is described as a single component, the processor 116, 136, 156 may be implemented as one or more separate components. Similarly, although the memory 115, 135, 155 is described as a single component, the memory 115, 135, 155 may be implemented as one or more separate components, some or all of which may be integrated/removable and/or may provide permanent/semi-permanent/dynamic/cached storage.

The memory 115 may store the computer program 117 comprising computer-executable instructions that control the operation of the apparatus 110 when loaded into the processor 116. As an example, the computer program 117 may include one or more sequences of one or more instructions. The computer program 117 may be provided as a computer program code. The processor 116 is able to load and execute the computer program 117 by reading the one or more sequences of one or more instructions included therein from the memory 115. The one or more sequences of one or more instructions may be configured to, when executed by the processor 116, cause the apparatus 110 to carry out operations, procedures and/or functions described in the foregoing in context of the first device 110. Hence, the apparatus 110 may comprise at least one processor 116 and at least one memory 115 including computer program code for one or more programs, the at least one memory 115 and the computer program code configured to, with the at least one processor 116, cause the apparatus 110 to perform operations, procedures and/or functions described in the foregoing in context of the first device 110. Similar considerations are equally valid for the corresponding components 13x of the second device 130 and for the corresponding components 15x of the third device 150.

Each of the computer programs 117, 137, 157 may be provided e.g. as a respective computer program product comprising at least one computer-readable non-transitory medium having program code stored thereon, the program code, when executed by the respective device or apparatus 110, 130, 150, causes the apparatus at least to perform operations, procedures and/or functions described in the foregoing in context of the respective device 110, 130, 150.

The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An apparatus comprising:
at least one processor; and
at least one memory including computer program code, the at least one memory and the computer program code being configured to, with the at least one processor, cause the apparatus at least to perform:
creating, in an initial pairing procedure with a first wireless device, one or more dedicated authentication keys for authenticating the first wireless device;
receiving, in connection with the initial pairing procedure with the first wireless device, one or more default authentication keys for authenticating a second wireless device that is not paired with the apparatus;

storing the one or more dedicated authentication keys for authenticating the first wireless device that is paired with the apparatus;

storing, in connection with the initial pairing procedure with the first wireless device, the one or more default authentication keys for authenticating the second wireless device that is not paired with the apparatus, said one or more default authentication keys being different than said one or more dedicated authentication keys;

selectively operating the apparatus in one of predefined states, said states comprising at least a first state where the apparatus is connectable but not discoverable by other wireless devices;

receiving connection requests from other wireless devices;

responsive to receiving, when the apparatus is operated in said first state, a connection request from the second wireless device that is not paired with the apparatus, verifying whether at least one of said default authentication keys is a valid authentication key for said second wireless device; and responsive to having found at least one of said authentication keys to be a valid authentication key for said second wireless device, establishing an authenticated connection with said second wireless device.

2. The apparatus according to claim 1, wherein the at least one memory and the computer code are further configured to, with the at least one processor, cause the apparatus to perform:

obtaining at least one of said one or more default authentication keys by using a key negotiation procedure with the first wireless device that is paired with the apparatus.

3. The apparatus according to claim 1, wherein at least one of said one or more default authentication keys is associated with a respective predefined user;

wherein said connection request comprises an identification of a user; and wherein said verifying considers only those default authentication keys that are associated with the user identified in the connection request.

4. The apparatus according to claim 1, wherein the apparatus is configured to apply the Bluetooth Basic Rate/Enhanced Data Rate protocol.

5. The apparatus according to claim 4, wherein said first state comprises a Bluetooth page scan substate; and said connection request comprises one or more Bluetooth page messages addressing the apparatus.

6. The apparatus according to claim 1, wherein said predefined states further comprise a second state where the apparatus is discoverable by other wireless devices; and wherein the at least one memory and the computer code are further configured to, with the at least one processor, cause the apparatus to perform:

responsive to receiving, when the apparatus is operated in said second state, one or more requests from a further wireless device that is not paired with the apparatus, obtaining a dedicated authentication key to establish pairing with said further wireless device.

7. The apparatus according to claim 6, wherein said obtaining the dedicated authentication key comprises:

responsive to receiving, when the apparatus is operated in said second state, one or more inquiry messages from said further wireless device, transmitting one or more inquiry response messages that comprise information that enables connection establishment with the apparatus; and responsive to receiving a connection request from said further wireless device, obtaining a dedicated authentication key to establish pairing with said further wireless device.

8. The apparatus according to claim 6, wherein the apparatus is configured to apply the Bluetooth Basic Rate/Enhanced Data Rate protocol.

9. The apparatus according to claim 8, wherein said first state comprises a Bluetooth page scan substate;

said second state comprises a Bluetooth inquiry scan substate; and said connection request comprises one or more Bluetooth page messages addressing to the apparatus.

10. A method comprising:

creating, in an initial pairing procedure with a first wireless device, one or more dedicated authentication keys for authenticating the first wireless device;

receiving, in connection with the initial pairing procedure with the first wireless device, one or more default authentication keys for authenticating a second wireless device that is not paired with the apparatus;

storing the one or more dedicated authentication keys for authenticating the first wireless device that is paired with the apparatus;

storing, in connection with the initial pairing procedure with the first wireless device, the one or more default authentication keys for authenticating the second wireless device that is not paired with the apparatus, said one or more default authentication keys being different than said one or more dedicated authentication keys;

selectively operating the apparatus in one of predefined states, said states comprising at least a first state where the apparatus is connectable but not discoverable by other wireless devices;

in response to having received, when the apparatus is operated in said first state, a connection request from the second wireless device that is not paired with the apparatus, verifying whether at least one of said authentication keys is a valid authentication key for said second wireless device; and in response to having found at least one of said authentication keys to be a valid authentication key for said second wireless device, establishing an authenticated connection with said second wireless device.

11. The method according to claim 10, further comprising:

obtaining at least one of said one or more default authentication keys by using a key negotiation procedure with the first wireless device that is paired with the apparatus.

12. The method according to claim 10, wherein at least one of said one or more default authentication keys is associated with a respective predefined user;

wherein said connection request comprises an identification of a user; and wherein said verifying comprises verifying only those default authentication keys that are associated with the user identified in the connection request.

13. The method according to claim 10, wherein said predefined states further comprise a second state where the apparatus is discoverable by other wireless devices, the method further comprising in response to receiving, when the apparatus is operated in said second state, one or more requests from a further wireless device that is not paired with the apparatus, obtaining a dedicated authentication key to establish pairing with said further wireless device.

14. The method according to claim 10, wherein said apparatus applies the Bluetooth Basic Rate/Enhanced Data Rate protocol.

15. A computer program product comprising a non-transitory computer readable medium having computer executable program code stored thereon, which when executed by at least one processor of an apparatus, causes the apparatus to perform the method according to claim 10.

16. A computer program product comprising a non-transitory computer readable medium having computer executable program code stored thereon, which when executed by at least one processor of an apparatus, causes the apparatus to perform the method according to claim 11.

17. A computer program product comprising a non-transitory computer readable medium having computer executable program code stored thereon, which when executed by at least one processor of an apparatus, causes the apparatus to perform the method according to claim 12.

18. A computer program product comprising a non-transitory computer readable medium having computer executable program code stored thereon, which when executed by at least one processor of an apparatus, causes the apparatus to perform the method according to claim 13.

19. A computer program product comprising a non-transitory computer readable medium having computer executable program code stored thereon, which when executed by at least one processor of an apparatus, causes the apparatus to perform the method according to claim 14.

* * * * *